June 28, 1949.  I. C. BECHTOLD ET AL  2,474,512
PULSATION ELIMINATION IN FLUID STREAMS
Filed Nov. 27, 1945
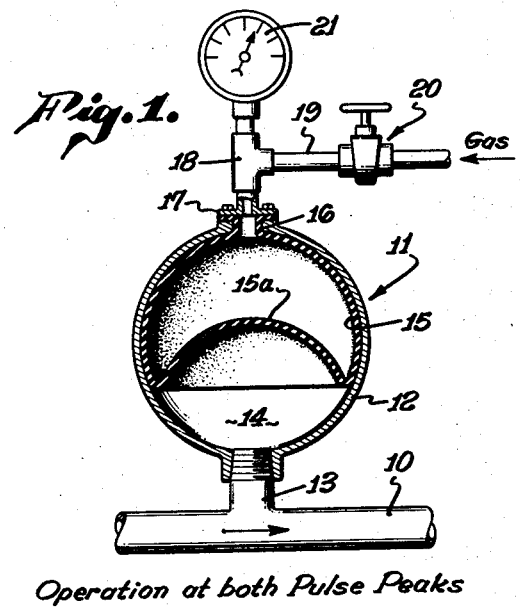
Operation at both Pulse Peaks
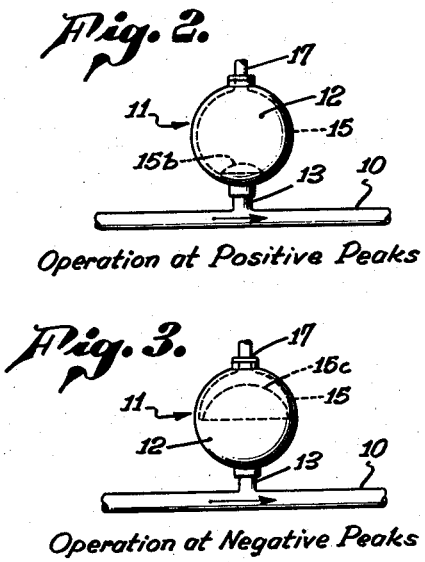
Operation at Positive Peaks
Operation at Negative Peaks
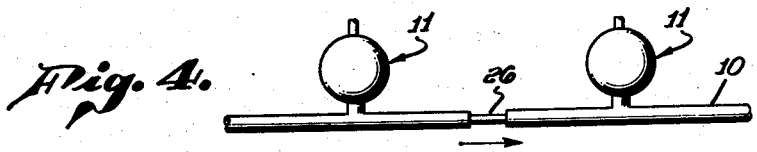
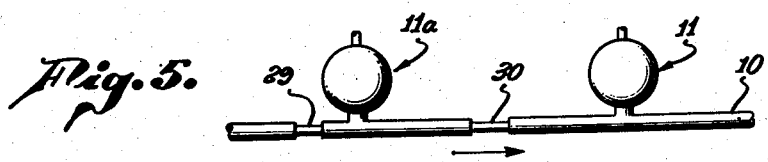
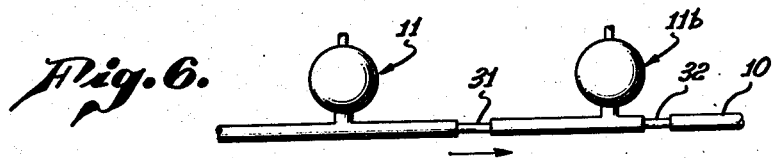
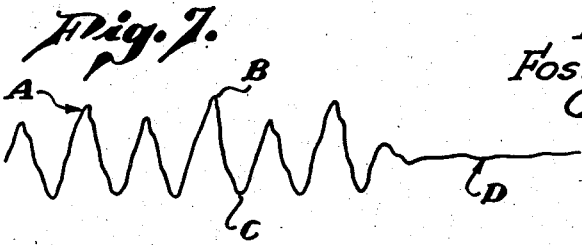
IRA C. BECHTOLD,
FOSTER M. STEPHENS,
CHARLES NEWMAN,
INVENTORS.
BY  *Heaburn White*
ATTORNEY.

Patented June 28, 1949

2,474,512

UNITED STATES PATENT OFFICE 2,474,512

PULSATION ELIMINATION IN FLUID STREAMS

Ira C. Bechtold, Whittier, Foster M. Stephens, Los Angeles, and Charles Newman, Hollywood, Calif., assignors to The Fluor Corporation, Ltd., Los Angeles, Calif., a corporation of California Application November 27, 1945, Serial No. 631,192

4 Claims. (Cl. 138—30)

This invention has to do with the dampening or elimination of pressure pulsations in fluid streams, subjected to pulsating flow as for example under the influence of piston-type or other pumps, and under conditions of pressure fluctuation, the particular nature of which may vary in different situations and in accordance with the operating characteristics of the pulsation creating mechanism.

Our general purpose is to provide for the substantial elimination of pulsations in a continuously flowing fluid (typically liquid) stream by improved means characterized by its extreme practicability and pulsation absorbing capacity, as well as its adaptability for pulsation eliminating response to pressure fluctuations that may vary widely in range and with relation to reference or base pressures. That is to say, in a given instance the pressure fluctuations, or limits of the increasing and decreasing pressure changes as shown by a pressure curve, may occur with substantial uniformity at both sides of a base pressure or (graphically) constant static pressure line representing the fluid pressure under non-pulsating conditions; or the pressure fluctuations may occur within ranges for the most part above or below the base pressure, as would be represented by pressure curves lying mainly at one side or the other of the static pressure line. As will appear, the present apparatus is capable of selective conditioning in conformance with whatever may be such pressure characteristics of the pulsations, to accomplish their effective elimination.

Another important consideration is the adaptability of the apparatus for use in various combinations to serve the purposes (analogous to correspondingly termed elements in electrical filtering systems) of a series of capacitances which may have any of the later described associations with (restricted) resistances or inductances in the path of the pulsating stream.

The invention particularly contemplates an improved type of pulsation converting unit or capacitance in the form of a vessel adapted to be connected with a line conducting the continuously flowing pulsating stream, and containing a bladder-like diaphragm engageable as a result of internally applied pressure, with the wall of the vessel, and normally have a substantial free area deflectible in response to changes in the differential of pressures inside and outside the diaphragm. The vessel is connected with the liquid line in a manner communicating liquid (and the stream pulsation) to one side of the diaphragm, and gas pressure is applied to the other side of the diaphragm so that the effect of pulsation deflections of the diaphragm is to produce alternate compression and expansion of the gas, which in turn tend to effect a compensating conversion of the liquid pulsations. While it is contemplated that the liquid and gas individually may be either inside or outside the diaphragm, generally it is preferred to maintain the gas under controlled or predetermined pressure inside the diaphragm, and accordingly the invention will be so described.

Further in connection with the described capacitance unit, we have employed for liquid stream pulsation dampening a vessel having a substantially spherical shell containing a diaphragm which in a condition of maximum distention, may engage and conform in shape to the shell. Thus the diaphragm cannot be ruptured by excessive internal pressure since, in the condition indicated, it is fully supported by the shell. The diaphragm effectively resists rupture by external pressure since, assuming the absence of internal resisting pressure, the result of external pressure is simply to collapse the diaphragm upon itself, again while being supported by the shell.

All the various features and objects of the invention, as well as the details of various illustrative embodiments, will appear to better advantage from the following description throughout which reference is had to the accompanying drawings, in which:

Fig. 1 is a sectional view showing one of the capacitances employed, with the gas pressure regulated to permit effective response of the diaphragm at both increasing and decreasing pressure peaks;

Fig. 2 is a reduced scale elevation illustrating the diaphragm condition as regulated for selective operation at positive pressure peaks;

Fig. 3 is a similar view illustrating the diaphragm condition for selective operation at negative pressure peaks;

Fig. 4 is a diagrammatic view showing multiple capacitances individually connected with the liquid line at opposite sides of a restriction;

Figs. 5 and 6 are similar views showing variational locations and combinations of the liquid line restrictions; and Fig. 7 is a reproduction of a test pressure curve illustrating the pulsation eliminating efficiency of the invention.

Referring first to Fig. 1, pipe 10 indicates a line conducting a continuously flowing stream of liquid in which pressure pulsations may be created for any reason, as by the pulsating influence of a piston type pump in the line. Each individual pulsation absorbing unit generally indicated at 11, is of simple construction comprising preferably a spherical shell 12 connected at 13 with line 10 so that liquid is communicated to the interior chamber or capacitance 14 and pressure pulsations in the liquid stream therefore are transmitted to the chamber. The shell contains a bladder-like diaphragm 15 which may be made of any suitable fluid impervious flexible material, preferably rubber, the thickness and composition of which may be selected for maximum flexibility and resistance to attack by the fluids contacting it in a given instance. Desirably the diaphragm 15 has a spherical shape and size so that when fully distended it will engage continuously and conform to the inner surface of the shell 12. The diaphragm may be inserted through the shell opening 16 and suitably clamped in place as by the flange fitting 17.

The invention contemplates the supply of gas to the diaphragm 15 by any suitable means whereby the gas may be maintained under selected or controlled pressure having predetermined or selected relation to the nature and magnitude of the liquid pressure pulsations in line 10. Merely as illustrative, gas is shown to be supplied to the diaphragm through fittings 17, 18 and line 19 containing an appropriate pressure regulating valve conventionally illustrated at 20. The valve may be of any known type capable of maintaining in the diaphragm a selected constant pressure indicated by the guage 21. As will appear, gas pressure in the diaphragm may be regulated in accordance with the characteristics and particular influences to be had upon the pressure pulsation peaks, and the gas pressure may be predetermined to this end or ascertained by variation or adjustment of the pressure until maximum elimination of the pulsations occurs in line 10 beyond its connection 13 with the capacitance.

In considering the operation of the described unit, it may be assumed first that its intended function is to cooperate in the latter described multiple capacitance systems to effect conversion and substantial elimination of both pulse peaks in the liquid stream, that is, pulsations created by pressure surges both above and below a static reference pressure. Under such conditions the gas pressure may be regulated, with relation to the fluid stream pressure, to maintain the diaphragm, or the lower deflected portion 15a thereof in an intermediate state of deflection, for example as indicated in Fig. 1. In this condition, the diaphragm is responsive to pulsations transmitted to the chamber 14, in the following manner: In response to positive pressure peaks or increasing pressures, the diaphragm deflects upwardly to compress its contained gas, thereby effecting an absorption of the positive pulsation. During intervals of decreasing liquid pressure or within what may be referred to as negative pressure peaks, the gas expands to deflect the diaphragm downwardly and in that manner exert against the liquid a compensating pressure influence. Under both conditions the action of the capacitance unit is one of pressure compensation tending to eliminate or minimize any carry-over of pulsations in the liquid stream beyond the connection 13.

Fig. 2 illustrates a variational operating condition intended for more selective operation at and elimination of positive pressure peaks, where the liquid stream pulsations are entirely or for the most part of that character. Here the gas pressure is regulated or increased to maintain a greater distention of the diaphragm 15 and exposure of a smaller area 15b for deflective response to the pressure pulsations.

Fig. 3 illustrates a typical condition of the diaphragm for selective operation at negative peaks, as where the liquid stream pulsations are largely or entirely of that character. Here the gas pressure is reduced to permit greater deflection of the diaphragm and exposure of a maximum area 15c thereof to the liquid and its negative pulsations.

As previously indicated, the invention contemplates use of the described capacitance in combination with a restriction in the line 10 which by analogy to electrical filtering systems may be in the nature of either resistance or inductance. Thus the resistance may be in the form of a relatively short length restriction. Where the restriction is to function in the nature of an inductance, it may consist of a relatively elongated pipe of smaller diameter than the pipe 10. In either the resistance or inductance type system, the combined effects of the capacitance chambers 14 and the restriction, is to accomplish at least under certain flow and pulsating conditions, more complete elimination of the pulsations than might occur by virtue of the capacitances alone.

We employ a plurality of the units or capacitances 11 in different combinations of resistances or inductances in predetermined relation to the capacitances. Thus a pair of the units 11 are shown to be connected at spaced locations with the line 10, each unit be constructured and controlled to function under any of the conditions described with reference to Figs. 1 to 3. Line 10 may contain one or more restrictions, of either the resistance or inductance type, though preferably the latter, in any of the arrangements shown in Figs. 4 through 6. In Fig. 4 the restriction at 26 is shown to be positioned in the flow pipe between the units 11. The restrictions may be used in pairs as in Fig. 5 where the restrictions 29 and 30 are placed at opposite sides of the unit 11a, and in Fig. 6 where the restrictions 31 and 32 are located at opposite sides of the unit 11b.

In the foregoing, reference has been made to the function of the variable (liquid) volume capacitances, e. g. 11, to have a converting influence on the liquid stream pressure pulsations. This effect is one accomplished by the ability of the capacitance, because of its responsiveness to increasing or decreasing liquid pressures, to exert a phase shifting influence on the line stream pulsations by presenting to each positive pulse a reduced or negative compensating pressure, and to each negative pulse an increased or positive compensating pressure. With the phases thus converted in a compensating manner, the tendency is toward regularization of the liquid stream pressure.

Further with reference to the nature and effect of a resistance as compared with an inductance, the primary function of a resistance is to effect a restriction resulting in pressure drop without taking into consideration any time element or particular relation to the phases of the pressure pulsations. Thus a resistance may be effected by an orifice plate. An inductance, on the other hand, may be predetermined to take into account and exert a phase shifting effect, thus involving a time factor in the phase sequence. More specifically, the presence of an elongated inductance restriction in the fluid stream, say in advance of a capacitance chamber, is to create a kinetic energy effect involving a retarding of, for example, a positive pressure surge and simultaneous increase of the stream velocity, and the discharge of the accelerated stream into the capacitance chamber so that the resulting energy of the phase-shifted pulse coincides with a negative pressure condition or pulse in the chamber to produce an average or substantially constant resultant pressure. As will be understood, the dimensions, i. e. length and diameter, of the inductance taken may be predetermined in accordance with the particular requirements of individual installations.

Fig. 7 is a reproduction of a pressure curve illustrating the pulsation eliminating efficiency typically of the system shown in Fig. 4, where line 10 consisted of a ¾ inch pipe conducting light oil or water at 600 p. s. i. gage static pressure and at a rate of 6 gallons per minute. The inductance was formed by a tube ¼ inch in internal diameter and 21 inches long. The metal shell of each of the capacitances 11 consisted of a 200 cubic inch sphere containing a bladder diaphragm in which gas pressure was maintained at 500 p. s. i. Line 10 connected with a pump whose operation normally transmitted severe pressure pulsations represented by that portion A of the pressure curve, the average pressure differential between the peaks B and C of the curve being in the order of 800 p. s. i. Portions A and D of the curve represent respectively the line (10), pressure conditions before and after passage of the liquid through the system of Fig. 4. The pressure pulsations were practically eliminated; the slight irregularities in portion D of the curve (representing the line pressure at the discharge side of the system) amounting to no more than about 6 p. s. i. as compared with the normal 800 p. s. i. differential.

We claim:

1. Apparatus for eliminating pressure pulsations in a liquid stream having a continuous pulsating flow through a line, comprising a pair of vessels separately connected to said line at spaced locations therealong, a flexible bladder-like diaphragm within each of said vessels and displaceable by internal pressure against the wall thereof, means for maintaining gas under pressure at one side of said diaphragms so that the gas is compressed and expanded in response respectively to increases and decreases of the liquid pressure applied to the opposite sides of the diaphragms, and a tube forming an elongated restriction in said line coacting with the fluid displacement in said vessels to shift the phases of the pulsations at said locations.

2. Apparatus for eliminating pulsations in a fluid stream having a continuous pulsating flow through a line, comprising means forming a pair of closed chambers connected to said line at spaced locations therealong and containing gas which compresses and expands in response to increasing and decreasing pressures transmitted through the fluid from said line, and means forming in said line an elongated restriction of smaller cross sectional area than said line operating to shift the normal phases of said pulsations being transmitted to one of the chambers.

3. Apparatus for eliminating pulsations in a fluid stream flowing continuously through a line, comprising means forming a pair of closed chambers connected to said line at spaced locations therealong and containing gas which compresses and expands in response to increasing and decreasing pressures transmitted through the fluid from said line, and an elongated pipe and circular and relatively small cross sectional area in said line between said locations restricting the fluid stream and operating to shift the normal phases of said pulsations being transmitted to one of the chambers.

4. Apparatus for eliminating pulsations in a fluid stream having a continuous pulsating flow through a line, comprising means forming a pair of chambers, means forming surge connections between said chambers and the line at spaced locations therealong, said chambers being closed except for said connections and containing gas which compresses and expands in response to increasing and decreasing pressures of the fluid in said line transmitted through said connections as the fluid flows past them, and a tube in said line between said connections restricting the fluid stream and operating to shift the normal phases of said pulsations being transmitted to one of the chambers.

IRA C. BECHTOLD.
FOSTER M. STEPHENS.
CHARLES NEWMAN.

REFERENCES CITED

The following references are of record in the file of this patent:

UNITED STATES PATENTS

| Number | Name | Date |
| --- | --- | --- |
| 1,622,843 | Price et al. | Mar. 29, 1927 |
| 1,734,389 | McClatchie | Nov. 5, 1929 |
| 1,957,894 | Longenecker | May 8, 1934 |
| 2,184,891 | Bourne | Dec. 26, 1939 |
| 2,300,722 | Adams et al. | Nov. 3, 1942 |
| 2,324,701 | Herman | July 20, 1943 |
| 2,331,921 | Mercier | Oct. 19, 1943 |
| 2,352,187 | Ellinwood | June 27, 1944 |
| 2,360,590 | Schweller | Oct. 17, 1944 |